(12) United States Patent
Kolodziej et al.

(10) Patent No.: US 6,276,056 B1
(45) Date of Patent: Aug. 21, 2001

(54) METHOD FOR MODIFYING A TORQUE CONVERTER HUB

(75) Inventors: Dennis Raymond Kolodziej, Redford Township; Matthew James Boehlefeld, Westland; Andrew Simonow, Livonia, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 25 days.

(21) Appl. No.: 08/994,974

(22) Filed: Dec. 19, 1997

(51) Int. Cl.⁷ .................. B23P 6/00; B23P 19/04
(52) U.S. Cl. ............ 29/889.1; 29/889.5; 29/402.06; 29/402.07; 29/402.11; 29/402.13
(58) Field of Search ............ 29/898.01, 402.06, 29/402.07, 402.08, 402.09, 402.11, 402.13, 401.1, 889.5, 889.22, 889.1

(56) References Cited

U.S. PATENT DOCUMENTS

| | | | |
|---|---|---|---|
| 2,463,580 | * 3/1949 | Warshyk et al. . | |
| 2,672,680 | * 3/1954 | Gerner . | |
| 2,752,668 | * 7/1956 | Sheen . | |
| 3,006,064 | * 10/1961 | Watson . | |
| 3,577,628 | 5/1971 | Bunyan . | |
| 3,739,892 | * 6/1973 | Liberty, Jr. .................. | 29/402.11 |
| 3,841,178 | * 10/1974 | Horwitz ................. | 29/401 |
| 3,878,012 | * 4/1975 | Williams . | |
| 3,889,346 | * 6/1975 | Horwitz .................... | 29/898.01 |
| 3,918,724 | * 11/1975 | Alley ....................... | 277/9 |
| 3,981,068 | 9/1976 | Ivey et al. . | |
| 4,017,201 | * 4/1977 | Adams et al. ............... | 29/401 |
| 4,059,365 | 11/1977 | Ivey et al. . | |
| 4,087,098 | * 5/1978 | Alley ....................... | 277/9 |
| 4,212,187 | 7/1980 | Scholz . | |
| 4,527,322 | * 7/1985 | Jackson . | |
| 4,617,711 | * 10/1986 | McMinn ..................... | 29/402.08 |
| 4,622,451 | * 11/1986 | Moriki et al. ............... | 219/76.1 |
| 4,700,033 | * 10/1987 | Clark . | |
| 4,841,615 | * 6/1989 | Ratner ..................... | 29/402.06 |
| 4,974,715 | 12/1990 | Koyama . | |
| 5,603,448 | 2/1997 | Woerner et al. . | |

FOREIGN PATENT DOCUMENTS

| | | | | |
|---|---|---|---|---|
| 203251-A | * 10/1983 | (DE) | ............. | 29/402.08 |
| 2271521 | * 4/1994 | (GB) | ............. | 29/402.13 |

* cited by examiner

Primary Examiner—David P. Bryant
(74) Attorney, Agent, or Firm—Frank G. McKenzie

(57) ABSTRACT

The instant invention provides an inexpensive method of repairing the hollow drive shaft hub of a torque converter impeller housing. The impeller hub is turned to a smaller outer diameter and a sleeve having a wear resistant surface is fitted to the turned outer hub diameter. The sleeve may be further secured by mechanical interference, bonding, or welding.

7 Claims, 2 Drawing Sheets

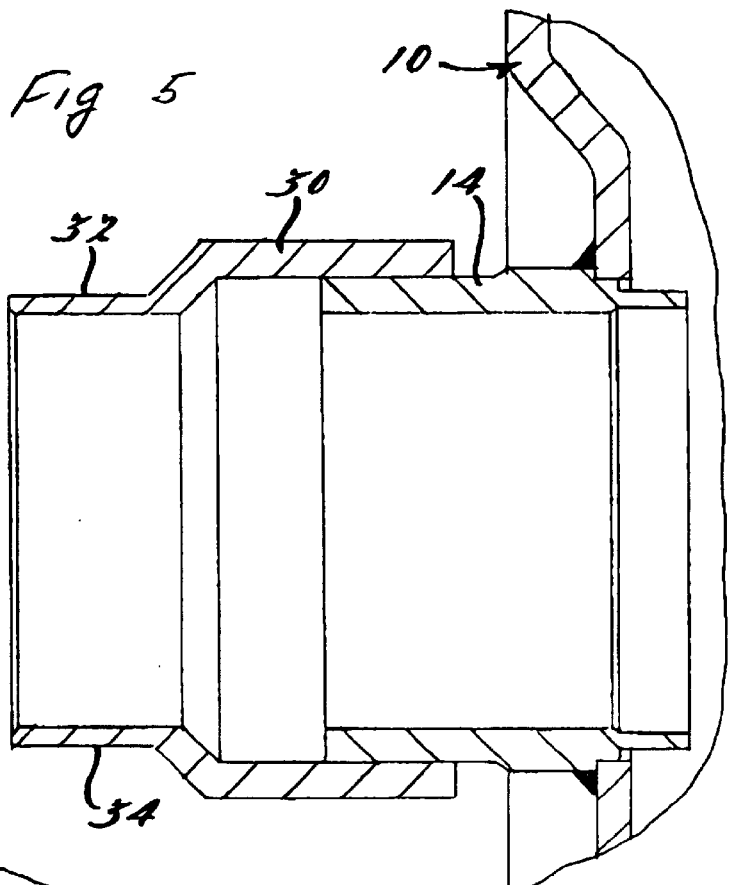
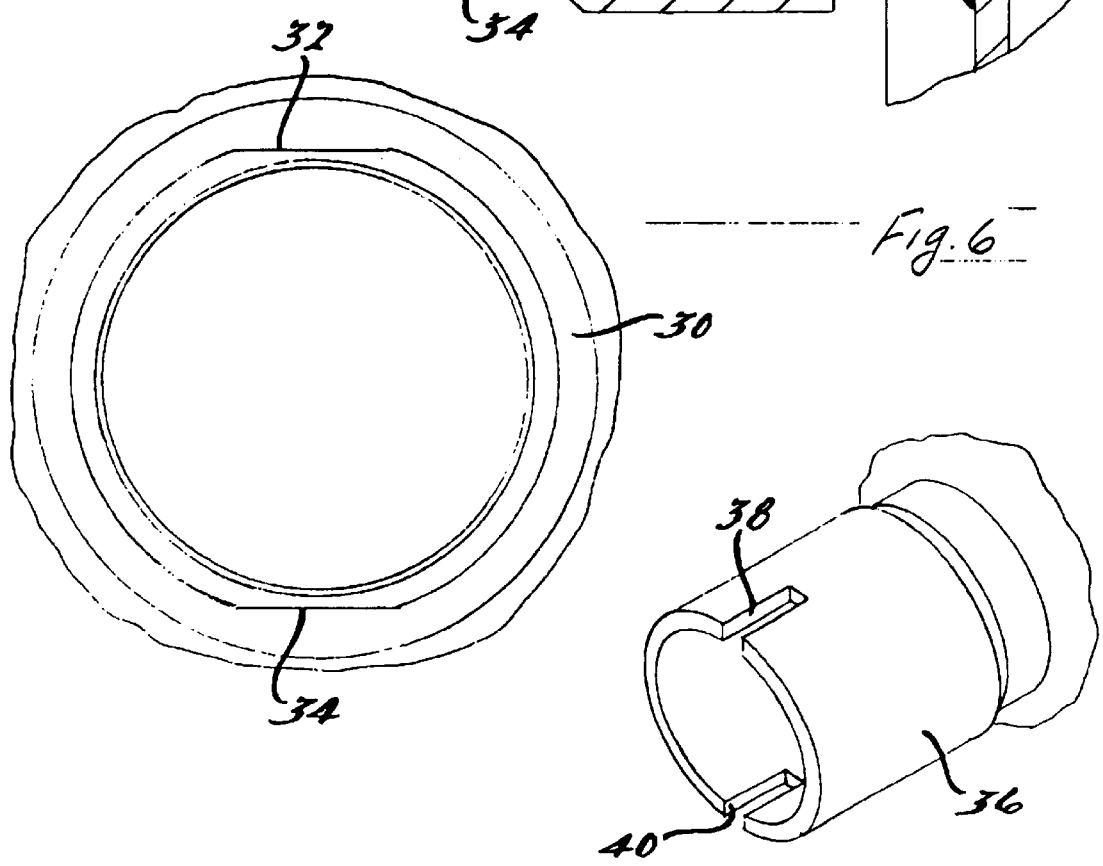

METHOD FOR MODIFYING A TORQUE CONVERTER HUB

BACKGROUND OF THE INVENTION

1. Field of the Invention

This invention relates to the field of torque converters for automatic transmissions. More particularly the instant invention pertains to the hub of a bladed wheel, such as an impeller, stator or turbine wheel.

2. Description of the Related Art

Automatic transmissions of the type employed in motor vehicles, commonly employ a mechanical gear train and a hydrokinetic torque converter on the input side of the transmission. The torque converter includes several rotating wheels fitted with radially extending vanes or blades, one of which is the driving member or impeller, another is the driven member or turbine. When assembled, the impeller and turbine define a toroidal cavity or chamber wherein hydraulic oil exiting the engine-driven impeller drives the turbine and the mechanical gear train driveably connected to the turbine.

Conventionally the components of the torque converters are formed from 1010 structural steel having a hardness of Rb 80. After extended service, the hub may become scored, or worn to a reduced size, or both. This wear directly, adversely affects the integrity of a seal that contacts the hub, and requires that the hub be either reconditioned or replaced. It has previously been necessary either to replace the entire impeller or turbine assembly with a new one, or to remove the tubular hub portion of the assembly and replace it with a new assembly.

Other than the expensive replacement of one or more components, various repair methods are known. One repair method generally practiced includes removing the integral hub by heating a weld between the housing and hub, and welding a new hub to the housing. In another method, the welded joint between the hub and the impeller cover or turbine housing is simply cut away and a new hub is welded to the assembly. As a practical matter, the concentricity of the outer surface of the hub must be corrected after a new hub is installed.

A further method used to recondition a worn torque converter hub is disclosed by Scholz in U.S. Pat. No. 4,212,187. Scholz teaches the use of an expansion tool to expand diametrically a worn impeller hub. The hub is expanded to a diameter greater than its original condition, then ground and finished to the original diameter.

Unfortunately, Scholz's expansion and grinding of the original hub decreases the final material thickness and weakens the hub. Further, as the hub still consists of the original material, the hub will wear in the same manner, and the problem will recur.

It is therefor desirable to provide a method for refurbishing a worn torque converter hub that is both inexpensive to execute and produces a durable product.

SUMMARY OF THE INVENTION

Responsive to the disadvantages of the prior art, the instant invention provides an efficient, inexpensive, effective technique for repairing or restoring the hub of a torque converter housing. The hub is turned to a smaller outer diameter than its original size and a sleeve, preferably having a wear resistant surface, is fitted to the turned outer hub surface.

According to one embodiment of the instant invention, the sleeve is fitted to the hub by mechanical interference.

A further embodiment of the instant invention provides for the further securing of the sleeve to the hub by adhesive, brazing or welding means.

A still further embodiment of the instant invention provides for a portion of the hub being cut away and a sleeve having a wear resistant surface being fitted to the remaining portion of the turned outer hub diameter.

These and other desired objects of the instant invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 5 is a partial cross section of a torque converter hub.

FIG. 6 is an end view of the hub of the torque converter of FIG. 5.

FIG. 7 is an isometric view of an alternate form of a torque converter hub.

DETAILED DESCRIPTION OF THE PREFERRED EMBODIMENTS

Figure 1:
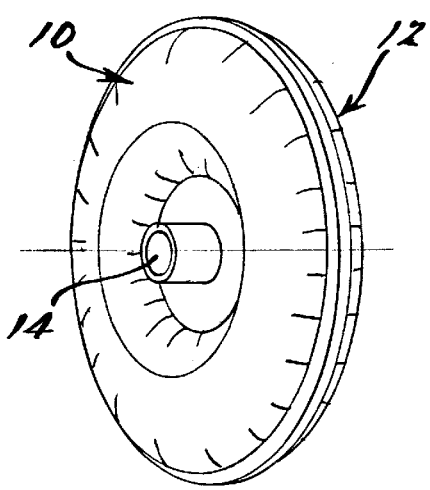
FIG. 1 is a perspective view of a torque converter.

The instant invention will be described through a series of drawings, which illustrate the instant invention. Referring to FIG. 1, there is shown a typical torque converter including an impeller assembly 10 and a turbine assembly 12, which cooperatively form a toroidal cavity. Blades 11 are fixed to the inner surface of housing 10, and similar blades are fixed to the inner surface of housing 12.

Preferably the blades are formed with tabs that are located in slots formed in the housing or case, the blades being distributed mutually spaced around the inner surface of the case. After locating the blades in this way, the blade tabs are rolled over so that each tab is closely adjacent the surface of the case, and the blades are held in position by bending the tabs in the slots while the assembly is moved from place-to-place during assembly. Then a copper-based brazing paste is spread over the areas where the tabs are located in the slots of the case. The assembly is place in a brazing furnace and the temperature of the assembly is raised to braze the blades to the case. This brazing operation softens the case in relation to its hardness condition before brazing.

The impeller housing 10 is driveably connected to an engine. In order to support rotatably the impeller and to prevent leakage of hydraulic fluid contained in the toroidal cavity, the exterior surfaces of the hub 14 are precisely dimensioned and finished to have a precision fit within a sealed bearing, not shown.

Figure 4:
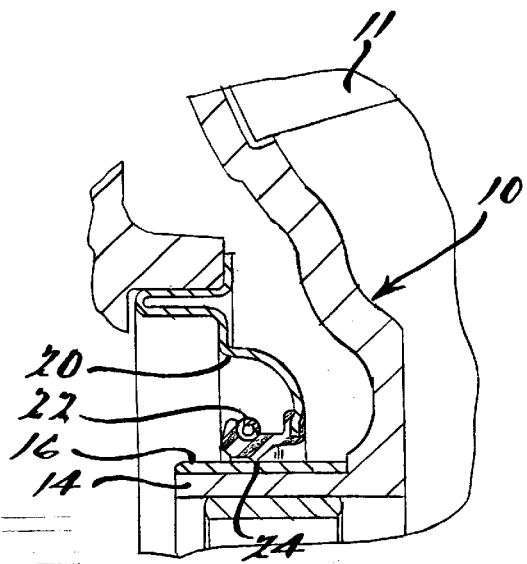
FIG. 4 is a partial cross section in the vicinity of the hub of a bladed wheel of a torque converter.

Referring now to FIG. 4, a hydraulic seal 20, located on the outer side of an impeller housing 10 is urged radially inward toward the outer surface of a sleeve 16 by a circular garter spring 22. The inner surface of the seal presents a localized line of contact 24 immediately below the spring that maintains preloaded contact with the sleeve as the hub and sleeve rotate relative to the seal. The hardened surface of the sleeve prevents the seal from wearing a circular groove in the sleeve. However, if the seal contacts the relatively soft surface of the hub 14, the preloaded seal can wear a groove into the hub surface. That groove compromises the seal integrity and permits leakage past the seal.

If the sleeve were absent, after extended service, the outer surface of the hub 14 may become scored or worn to a reduced size, or both. This wear directly and adversely affects the integrity of the hydraulic seal between the hub and its bearing, and requires that the hub 14 be reconditioned. The present invention provides a method for repairing the worn hub while attached to the impeller housing 10.

Figure 2:
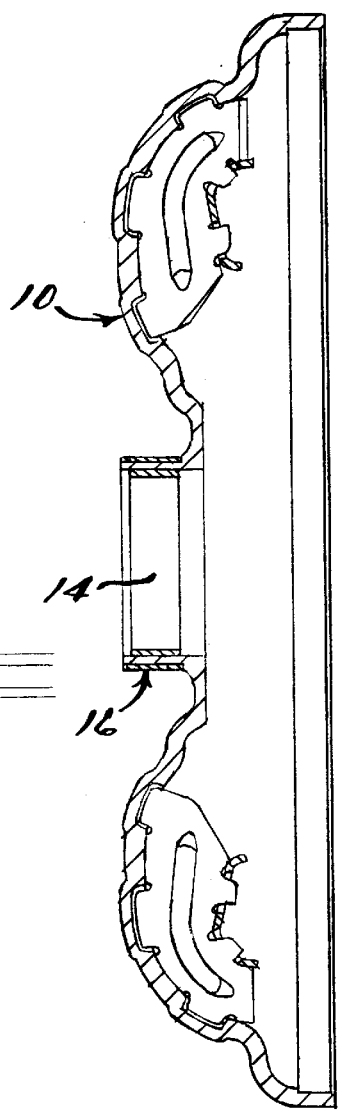
FIG. 2 is an enlarged vertical section of a bladed wheel of the torque converter shown in FIG. 1.

As shown in FIG. 2, the method is initiated by removing material from the outer surface of the hub 10 to produce a smaller outer diameter or size than that of the outer surface of the hub as originally produced. The material can be removed by turning and machining or grinding, or by other techniques. The diameter of hub 10 after finishing depends on the inner diameter of the sleeve 16 and whether an interference mechanical fit or shrink fit is used. The outer surface of the hub may be knurled after material removal to facilitate fixing the sleeve 16 to the hub 10. Alternately sleeve 16 may be fixed or secured to the hub by adhesive bonding, brazing or welding, in which methods the dimension of the hub outer surface or diameter after material removal is less critical. The size or outer diameter of the hub 10 after material removal generally requires providing a smooth, concentric surface for fitting the sleeve 16.

A sleeve 16 is formed, preferably of a wear resistant material such as hardened steel in the form of a hollow right circular cylinder. An example of a preferred wear resistant material is 1018 structural steel tubing having a minimum hardness of Rb 90. The sleeve outer diameter is determined by the original unworn hub diameter. The insertion end of the hub or sleeve may be beveled or chamfered for ease of installation. The sleeve 16 is then fitted to the hub 10 after material removal as described above. If an interference fit or shrink fit is used, the sleeve may be forced over the hub outer surface by pressing or some other acceptable method depending on the magnitude of interference between the hub 14 and sleeve 16.

Figure 3:
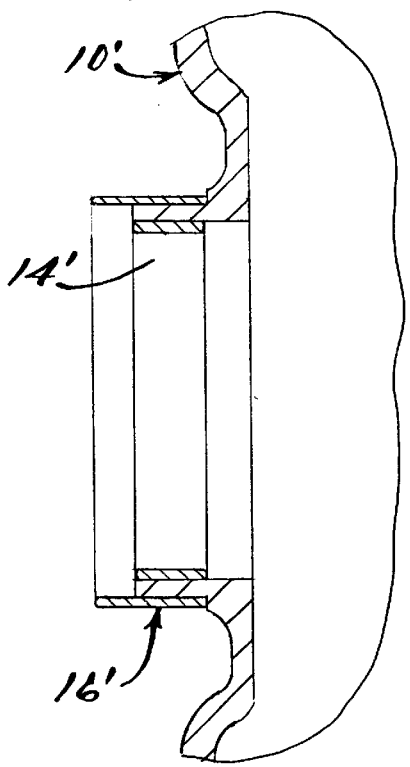
FIG. 3 is an alternate embodiment of the present invention.

In an alternate embodiment of the present invention, FIG. 3 shows an axial end portion of the original hub removed. This eliminates a majority of the damaged surface and allows for less material removal by grinding or machining. Further the sleeve 16' must only be pressed over a shorter hub 10' length.

Similarly, a sleeve 30 having a stepped surface includes diametrically opposite flats 32,34 formed on its outer surface facilitate attachment to a shaft. FIG. 7 shows a sleeve 36 formed with diametrically opposite axial slots 38,40 that provide means for attachment to a shaft.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed is:

1. A method for modifying a substantially cylindrical hub of a torque converter wheel comprising the steps of:

forming a right circular hollow cylindrical sleeve having an inner surface and outer surface, the outer surface being harder than the material of the outer surface of the hub;

fitting the sleeve over the outer surface of the hub; and fixing the sleeve to the outer surface of the hub against displacement relative thereto.

2. The method of claim 1, wherein the step of forming a sleeve includes forming the inner surface of the sleeve having an inner diameter, the outer surface of the sleeve having an outer diameter being substantially the same as the outer surface of the hub, the inner diameter being sized to fit over the outer surface of the hub.

3. The method of claim 1, wherein said hub and sleeve are fixed together by producing a mechanical interference fit therebetween.

4. The method of claim 1, wherein said hub and said sleeve are fixed together by the steps of:

applying an adhesive material between the outer surface of the hub and inner surface of the sleeve; and producing an adhesive bond between the outer surface of the hub and inner surface of the sleeve.

5. The method of claim 1, wherein said hub and said sleeve are fixed together by welding.

6. The method of claim 1, wherein said hub and said sleeve are fixed together by brazing.

7. The method of claim 1, further comprising the steps of:

removing a portion of the length the hub from a free end thereof so that a portion of said hub remains; and removing material from the outer surface of the remaining hub portion to reduce the size of the outer surface of the hub from the size of the hub as originally produced.

* * * * *